April 19, 1938.  E. C. BRODIN  2,114,954

SEALED BEARING

Filed Jan. 10, 1936

INVENTOR.
Eric C. Brodin
BY *Chas. Lyon Russell*
his ATTORNEY.

Patented Apr. 19, 1938

2,114,954

UNITED STATES PATENT OFFICE 2,114,954

SEALED BEARING

Eric C. Brodin, Jenkintown, Pa., assignor to S K F Industries, Inc., Philadelphia, Pa., a corporation of Delaware Application January 10, 1936, Serial No. 58,441

2 Claims. (Cl. 308—187.2)

This invention relates to sealed bearings and has for an object to provide an improved sealed bearing, sealing means and the method of applying such seal.

Another object of the invention is to provide a sealing plate which may be expanded and securely and permanently fixed in a groove formed in the inner periphery of the outer ring of an anti-friction bearing.

Another object of the invention is to provide a sealing plate for an anti-friction bearing, in one ring of which bearing the land or shoulder outwardly of the groove into which the plate is to be expanded is of larger diameter than is the entering in portion of the plate before it is expanded.

In the drawing accompanying this specification, one practicable embodiment of my invention is illustrated in connection with what I now regard as the preferred mode of assembling such bearing:

Figure 1:
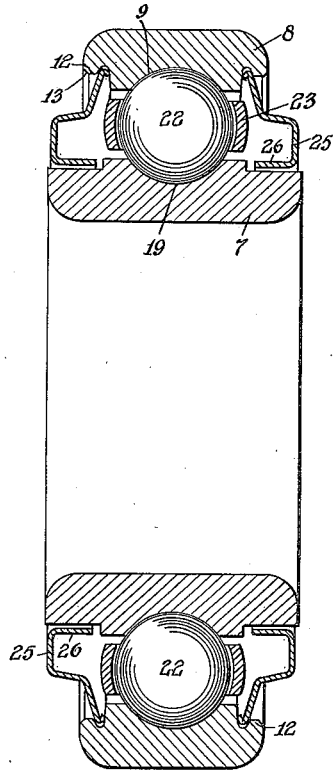
Figure 1 is an axial section through a bearing made in accordance with my invention.

The bearing selected for illustrating this invention is a single row deep groove ball bearing having an inner race ring 7 and an outer race ring 8, which latter race ring is illustrated as being much narrower in cross section than is the inner race ring, consequently the bearing may be referred to as an extended inner race ring type. In the present instance the bearing is shown as being symmetrical on both sides of its center plane.

The outer race ring is shown formed with a ball race groove 9 outwardly of which there is a land 10 on each side. This land in the illustration is somewhat narrower than is the usual ball bearing practice, because there is formed outwardly of it a circumferential groove 11. In one aspect it may be said that the groove is formed in the inner perimeter of the outer race ring of the bearing and has its opening directed toward the inner race ring 7. Outwardly of the groove 11 there is a land 12, the face 13 of which is preferably substantially cylindrical and of greater diameter than is the face 14 of the land 10. The walls of the groove may be assumed to comprise an outwardly directed plane face or wall 15, an inwardly directed sloping face or wall 16, and a curved wall face 17 uniting these. The outer corner 18 of the land 12 is preferably chamfered.

The inner race ring 7 has a race groove 19 formed in it. Outwardly of this groove at each side there is shown a land 20; outwardly of the land 20 a cylindrical portion 21 is formed. The outer surface of this cylindrical portion 21 is of less diameter than is the cylindrical outer face of the land 20.

A series of balls 22 is shown mounted in the grooves 9 and 19, and these balls are represented as carrying a cage 23.

Figure 2:
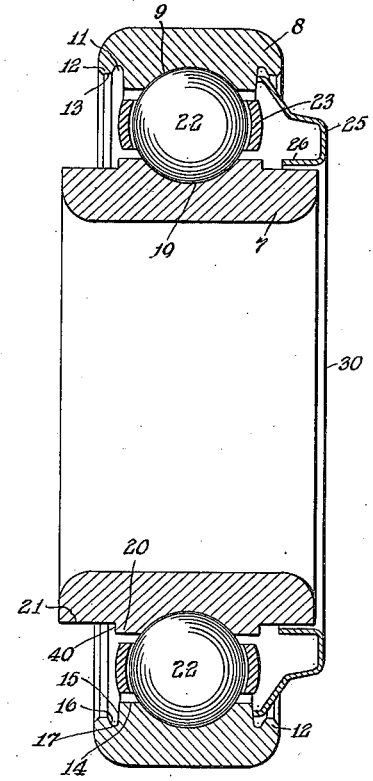
Figure 2 is an axial section showing one of the sealing plates in position, ready to be pressed and expanded into its finished location.
Figure 3:
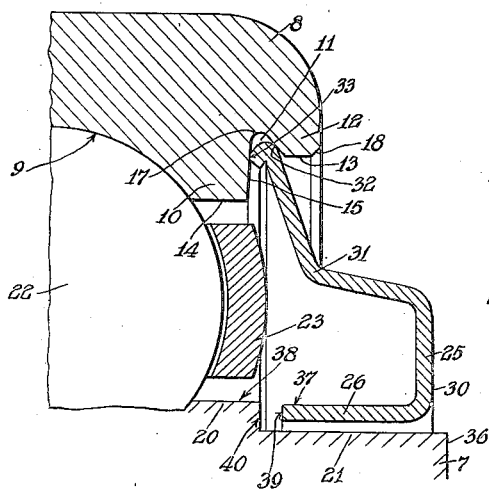
Figure 3 is an enlarged detail view of the parts seen in the upper right hand corner of Figure 1, showing the sealing plate expanded into the groove in the outer race ring.
Figure 4:
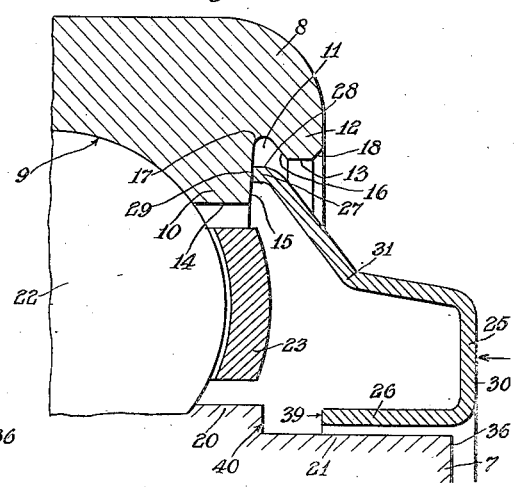
Figure 4 is a similar view of the same parts in Figure 2.

The plate or closure member before assembly is about as represented in Figures 2 and 4; that is, it has a plane portion 25 an inwardly directed transverse portion 26 which is substantially cylindrical. At its outer edge the plate has a short substantially cylindrical portion 27, the outer surface 28 of which is of less diameter than is the diameter of the face 13 of the land 12, which permits the free insertion of the plate into position to be expanded and forced into the groove 11 during the remainder of the seating operation. With the plate in the position shown in Figures 2 and 4 having the end 29 of the portion 27 against the outwardly facing wall 15 of the groove 11, this wall preferably occupying a radial plane; application of pressure to the outer face 30 around the entire portion 25 of the plate in the direction of the arrow causes the plate to bend in about the region 31, really about the entire circumference represented by such reference character. The bending of the plate expands its outer edge up into the bottom of the groove 11, until there is circumferential contact at 32 with the inwardly facing wall 16 of the land 12 and also along the broad line 31 on the wall 27 of the groove face 33 which is formed by mashing in the outer corner of the end 29. During this movement the cylindrical portion indicated by 27 is abruptly bent, see 35 Figures 1 and 3. Preferably the parts are so formed and proportioned that this bend does not completely bottom in the groove 11. As will be noted, particularly by reference to Figures 3 and 4, during the seating operation the inwardly directed transverse flange 26 has moved further into the space formed by the undercut represented by 21 and the outer face 30 is well within the end face 36 of the inner ring of the bearing, this being the widest portion of the bearing illustrated. Preferably the inner surface 37 of the flange 26 coincides with the surface 38 of the land 20.

It will be seen that the plate when assembled is disposed at an appreciable distance from the balls 22 and their cage 23 and that there is ample space within the plate to contain a large supply of lubricant.

It will also be noted that there is a small or definite clearance between the surface 39 of the flange 26 and the face 40 of the land 20. This provides ample clearance in the running of the bearing but is sufficiently close for preventing the escape of lubricant or the entrance of foreign matter into the bearing and the parts are also of such relative shapes and proportions that there is not any pumping action either inwardly or outwardly during operation.

Having thus described my invention, I claim and desire to secure by Letters Patent:

1. An antifriction bearing having an inner race ring and an outer race ring, the outer race ring being formed outwardly of its raceway with a land, and there being formed in the inner perimeter of the ring outwardly of such land a circumferential groove opening toward the inner race ring, there being outwardly of such groove a land of greater diameter than is the land inwardly of such groove, the walls of the groove comprising an outwardly directed plane wall face, an inwardly directed sloping wall face, and a wall face uniting these, and a closure plate, the outer edge of the plate being seated in the groove, there being circumferential contact with the inwardly facing wall of the outer land and also along a broad line on the outwardly facing wall of the groove, the edge portion of the plate being abruptly bent inwardly, this bend not completely bottoming in the groove.

2. An antifriction bearing, the outer race ring being formed with a land on each side, and there being formed in the inner perimeter of the ring outwardly of each such land a circumferential groove opening toward the inner race ring, there being a land outwardly of such groove of greater diameter than is the land inwardly thereof, the walls of the groove comprising an outwardly directed plane wall face, an inwardly directed sloping wall face, and a wall face uniting these, and a closure plate having its outer edge seated in each of the said grooves, it having circumferential contact with the inwardly facing wall of the outer land and also along a broad line on the outwardly facing wall of the groove, the edge portion of the plate being abruptly bent inwardly, this bend not completely bottoming in the groove.

ERIC C. BRODIN.